United States Patent
Cybart et al.

(10) Patent No.: US 7,600,880 B2
(45) Date of Patent: Oct. 13, 2009

(54) DEVICE WITH MODAL LIGHTING CONTROL AND METHOD THEREOF

(75) Inventors: Adam K. Cybart, Mc Henry, IL (US); Andy K. Baw, Wheeling, IL (US); David G. Fliszar, Gurnee, IL (US); Harold J. Gorenz, Lisle, IL (US); Rick Latella, Woodstock, IL (US)

(73) Assignee: Motorola, Inc., Schaumburg, IL (US)

(*) Notice: Subject to any disclaimer, the term of this patent is extended or adjusted under 35 U.S.C. 154(b) by 107 days.

(21) Appl. No.: 11/423,513

(22) Filed: Jun. 12, 2006

(65) Prior Publication Data

US 2007/0285913 A1    Dec. 13, 2007

(51) Int. Cl.
*H04M 1/22* (2006.01)
(52) U.S. Cl. .............. 362/24; 362/84; 362/85; 362/800; 362/27; 362/558; 362/228
(58) Field of Classification Search .......... 362/24, 362/800, 26, 227, 27, 29, 30, 85, 558, 228, 362/249.02, 355; 345/170; 200/312
See application file for complete search history.

(56) References Cited

U.S. PATENT DOCUMENTS

| | | | | |
|---|---|---|---|---|
| 3,828,611 A | * | 8/1974 | Shamlian et al. .............. 73/300 |
| 5,747,756 A | | 5/1998 | Boedecker | |
| 6,761,462 B2 | * | 7/2004 | Yoshida ..................... 362/109 |
| 6,984,799 B2 | | 1/2006 | Kawaguchi et al. | |
| 7,249,861 B2 | * | 7/2007 | Coleman et al. ............. 362/24 |
| 2001/0040802 A1 | * | 11/2001 | Shipman .................... 362/227 |
| 2002/0142840 A1 | | 10/2002 | Wolinsky | |
| 2005/0068787 A1 | | 3/2005 | Ishida | |
| 2008/0179172 A1 | * | 7/2008 | Sellers ....................... 200/314 |

FOREIGN PATENT DOCUMENTS

WO    03/028000 A1    4/2003

* cited by examiner

*Primary Examiner*—Sandra L O'Shea
*Assistant Examiner*—Jessica L McMillan
(74) *Attorney, Agent, or Firm*—Gary J. Cunningham

(57) ABSTRACT

A device (50) with modal lighting includes a translucent layer (74); a first light source (60) operative to project light (94) through the translucent layer (74); and a second light source (65b) operative to project light (93) through the translucent layer (74). The first light source (60) prevents light (91) projected from the second light source (65b) from entering a portion (74a) of the translucent layer. A method (250) for modal lighting in a device includes projecting light by a first light source through a translucent layer (260); projecting light by a second light source through the translucent layer (270); and preventing, by the first light source light, projected by the second light source from entering a portion of the translucent layer (280).

23 Claims, 6 Drawing Sheets

DEVICE WITH MODAL LIGHTING CONTROL AND METHOD THEREOF

FIELD OF THE INVENTION

The invention relates generally to wireless handset devices, other electronic devices and, more particularly, to wireless handset devices and other electronic devices that employ lighting such as for user interfaces, keypads or other purposes.

BACKGROUND OF THE INVENTION

Electronic devices and wireless communication handsets, such as cell phones, and similar devices are beginning to integrate multiple functions, or modes. For example, cellular telephones are now integrating imaging, music, and video playback/recording, messaging, GPS, and other functional modes along with cellular telephony. These additional modes typically require the addition of new dedicated keys, or input devices, to basic phone keys to facilitate user navigation or initiation of mode functions. In addition to multiple functional mode integration, these devices are becoming smaller and thinner. As a result, an increasing number of control keys must be integrated into the device keypad area. The addition of dedicated keys may create a cluttered, or complex, design that may be difficult to manufacture. In addition, a cluttered key layout may be difficult for users to intuitively understand and successfully navigate. It is therefore very useful to provide a wireless communication handset with modal lighting operable to highlight mode-specific operator keys.

BRIEF DESCRIPTION OF THE DRAWINGS

The present invention and the corresponding advantages and features provided thereby will be best understood and appreciated upon review of the following detailed description of the invention, taken in conjunction with the following drawings, where like numerals represent like elements, in which.

DETAILED DESCRIPTION OF THE INVENTION

A device, such as a cell phone or other device employs modal lighting and includes a translucent layer. A first light source projects light through the translucent layer. A second light source projects light through the translucent layer. However, the first light source prevents light projected from the second light source from entering a portion of the translucent layer.

As such, a method and apparatus is disclosed that enables modal lighting of the keypad of the device. Various portions of a translucent layer over the device keys may be selectively lit based on the operating mode of the device. The number of keys required to implement multiple operating modes may be reduced through key sharing. A shared key may have different lighting or graphics depending on the operating mode. The space requirements for implementing modal lighting are optimized by using one lighting source to advantageously prevent light projected by another light source from entering a portion of the translucent layer.

Figure 2:
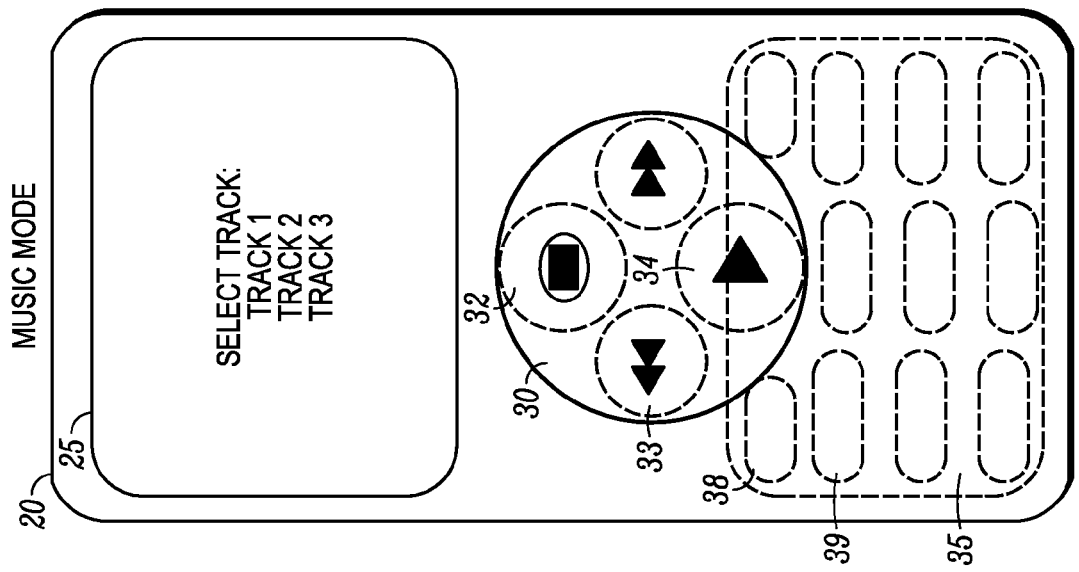
FIGS. 1 through 3 are top views of a device illustrating one example of modal lighting control in accordance with one embodiment of the invention.
Figure 1:
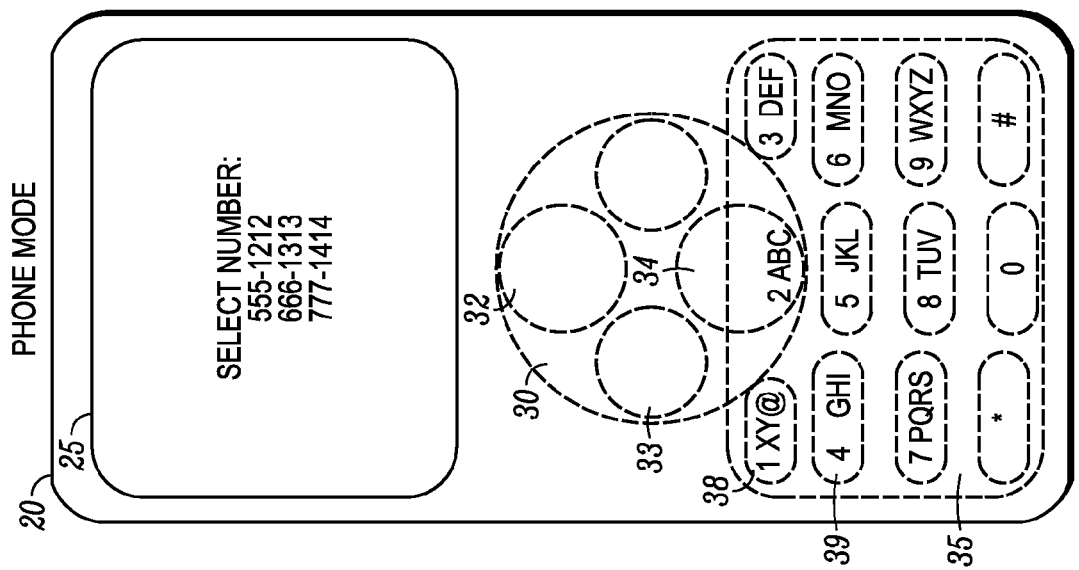
Figure 3:
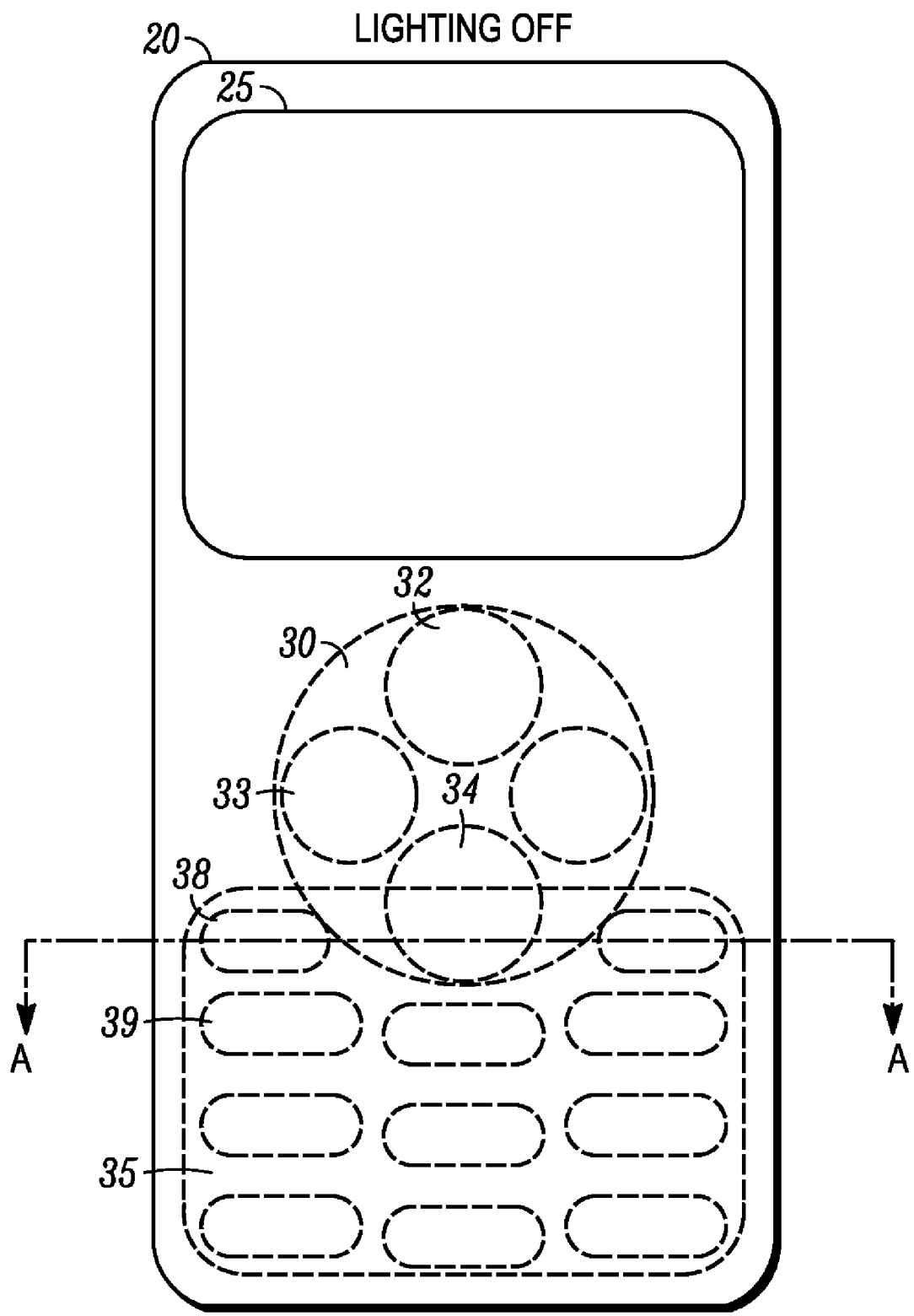

FIGS. 1-3 are top views of a handset device illustrating one example of modal lighting control in accordance with one embodiment of the invention. A wireless communications device 20, such as a cellular telephone, is shown in top view. However, it will be recognized that the modal lighting control structure described herein may be employed on any suitable device. The device 20 is one that may be operated in multiple modes. The device 20 may combine cellular telephony with integrating imaging, music, or video playback/recording, messaging, GPS, and/or other functional modes. In this example, the device 20 includes a phone mode and a music mode that are illustrated along with a mode where all lighting is turned off. Multiple combinations of device modes may be used. The device 20 may have a display 25 such as an LCD or flat panel display as is known in the art. The display 25 may further be operable as an input device. It will be recognized that device may be any suitable device such as but not limited to a wireless or non-wireless device, handheld or non-handheld devices such as set top boxes, digital audio players, video players, camcorders, HDTVs, computers or any other suitable device.

The handset device 20 has a keypad area or several keypad areas operable for user control of the operating modes of the device 20. In this particular example, the device 20 has a music mode keypad area 30 and a phone mode keypad area 35. The music mode keypad area 30 has several music mode keys 32, 33, and 34. The phone keypad area 35 has several phone mode keys 38, 39, and 34. In this example, one key 34 is shared between the phone mode and music mode.

To enhance user operability, the key pads 32, 33, 34, 38, and 39 of the handset device 20 feature backlit graphics. For example, during phone mode operation, light may be selectively shown through the "number 1" key pad 38 such that "1 XY@" is displayed to the user. Backlit graphics may be displayed for all of the keypads in the phone keypad area 35 during phone mode. In similar fashion, light may be selectively shown through the keypads in the music keypad area 30 during music mode operation. For example, during music mode, light may be selectively shown through the music keypad 34 corresponding to the "play" key. By selectively lighting keypad graphics, the handset device 20 clearly displays the operating mode to the user. For example the handset device 20 clearly indicates operation in phone mode when all of the keys in the phone mode keypad area 35 are lit. Similarly, the handset device indicates music mode when all of the keys in the music mode keypad area 30 are lit.

In addition to selectively lighting keypads based on operating mode, the handset device 20 may also have stealth keypads and a stealth operating mode. A stealth key pad may be constructed such that the keypad graphics become invisible, or simply blend into the background color of the device 20, when the keypad is no longer backlit. For example, in phone mode, the graphics of the music reverse key 39 may become invisible or stealthy because the music mode backlighting is off. Selective back-lighting keypads may indicate the operating mode of the handset device 20 and may aid the user in accessing the correct keypad. In addition, all of the back lighting may be turned off in a "lights off" mode such that all of the keypads are stealthy or invisible. The modal lighting of the handset device 20 is useful for selectively lighting graphics of keypads that are closely spaced or where a keypad 34 is shared between operating modes. Other advantages will be recognized by those of ordinary skill in the art.

In one example, the music mode keypad area 30 may be backlit with an electroluminescent (EL) panel (such as D Flex type EL panels from Rogers Durel, USA or any suitable structure) and the phone mode keypad area 35 may be backlit with a series of light emitting diodes (LED). As will be further describe below, the EL panel and the LEDs may be further arranged such that the light projected by the EL panel is transmitted through the music mode keypad area 30 and the light projected by the LEDs is projected through the phone mode keypad area 35. Further, the EL panel is placed to physically prevent light projected by the LEDs from transmitting through the music mode keypad area 30.

Figure 4:
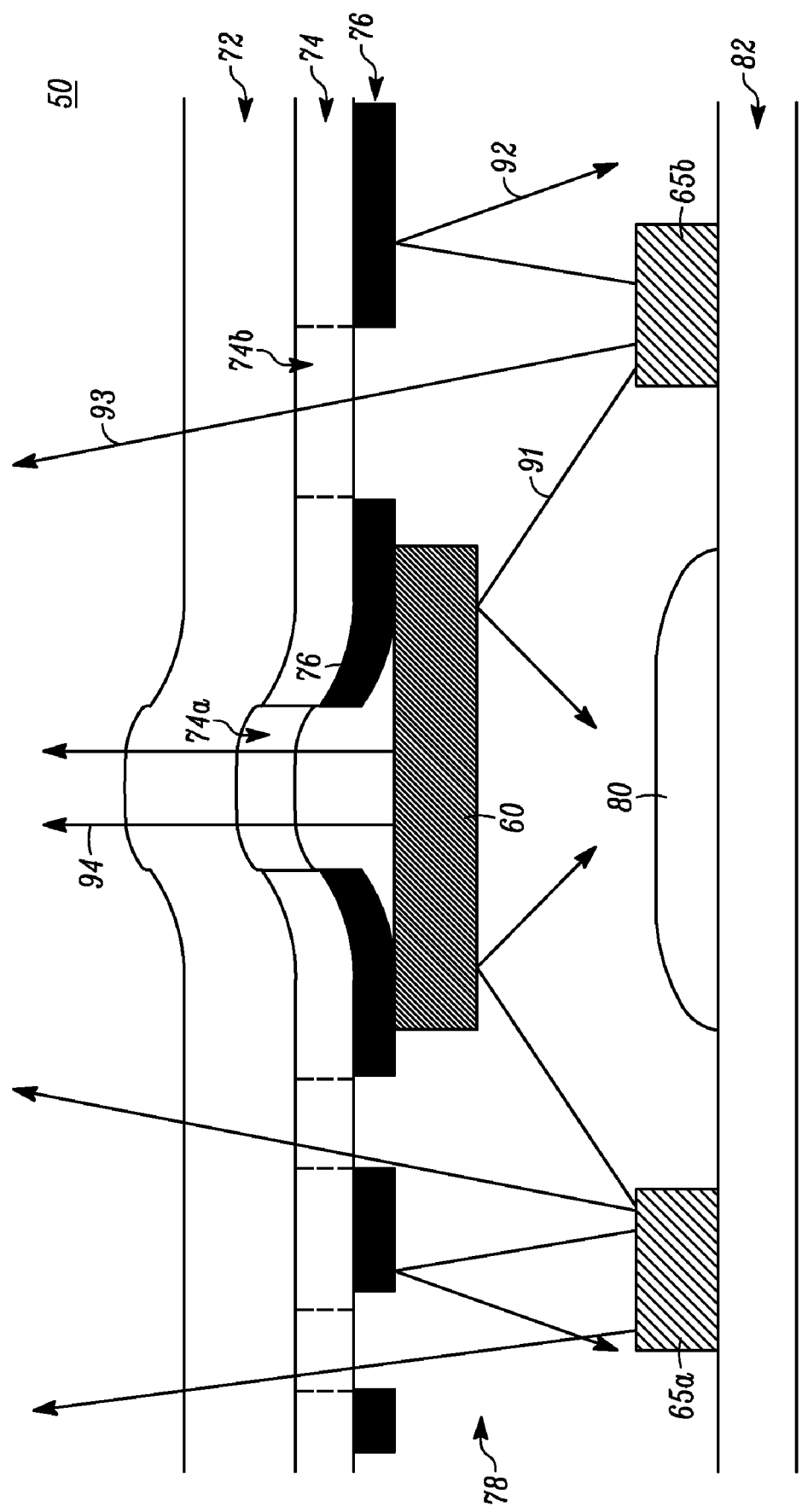
FIG. 4 is a cross sectional view of a portion of the keypad of the device of FIG. 3 illustrating one example of a modal lighting controlled device in accordance with one embodiment of the invention.

FIG. 4 is a cross sectional view of a portion of the keypad of the device of FIG. 3 illustrating one example of a modal lighting controlled device in accordance with one embodiment of the invention. The cross section depicts the handset device from a PC film layer 72 down to a substrate layer 82. The device 50 includes at least one keypad 80. The keypad 80 may be any suitable type of electrical interconnect switch as known in the art. For example, a carbon pill or a capacitance switch may be used or any other suitable structure. The keypad 80 may provide mechanical feedback to the user. For example, a dome of silicon or other flexible material may be used to provide tactile feedback. The keypad 80 may be mounted on a substrate 82 or circuit board.

A translucent layer 74 is included overlying the keypad 80. The translucent layer 74 allows any desired degree of light to pass such that graphics may be displayed for the handset user. The translucent layer 74 may be completely transparent or may be translucent. As used herein "translucent" includes transparent and any degree of translucence. For example, a translucent material 74 can pass all of the incident backlight without imparting or altering the color. By comparison, a translucent 74 material may instead filter or impart a color on light. Examples of tanslucnet layers may include but are not limited to custom ink formulizations from Transtech, Carol Stream Ill. Transflective and Privacy Films from 3M, Vacuumed Deposited metals from Fukuda, or any suitable materials.

A first light source 60 is included that is operative to project light 94 through the translucent layer 74. A second light source, shown as two sources 65a and 65b, is included that is operative to project light 93 through the translucent layer 74. The first light source 60 prevents light 91 projected by the second light source from entering a section 74a of the translucent layer 74. The first light source 60 may be, for example, an electroluminescence (EL) panel. For example, an EL panel 60 may be laminated onto any of the various materials in the modal lighting control device such as the translucent layer 74, an opaque layer 76, or a wave guide layer 78. Alternatively, the first light source 60 may be an LED device that is mounted onto a flexible substrate where the combination of the LED device and flexible substrate is operable to project light thought the translucent layer 74 while blocking light from the second light source.

An opaque layer 76 may be included to prevent back lighting from the first or second light sources 60, 65a, and 65b from entering the translucent layer 74. The opaque layer 76 may be used to create a silhouette of the desired graphics. That is, an outline of a graphic such as a "1" or the play arrow is formed by the opaque layer 76 such that backlighting transmitted though the translucent layer 74 will generate a lighted image such as a "1" or a play arrow. The opaque layer 76 may also be used for all non-lit areas or may be visible in all operating modes of the handset device 50.

A PC film layer 72 may be included as a covering surface for the handset device 50. The PC film layer 72 may be translucent or semi-translucent. The translucent layer 74 and opaque layer 76 may be laminated onto the PC film layer 72 or may be printed on this layer 72. The PC layer 72 may be formed of a material that will withstand user handling and prevent environmental contamination from entering the device 50.

A light guide layer 78 may be included between the second light source 65a and 65b and the translucent layer 74. The light guide layer 78 may be used to distribute light from the second light source 65a and 65b to several portions 74b of the translucent layer 74. The light guide may be a translucent, flexible material such as silicone, acrylic, or TPU. If the first light source 60 is an EL panel, then this EL panel may be laminated onto or molded onto the light guide layer 78.

The second light source 65a and 65b may be, for example, an LED or series of LEDs. LED devices 65a and 65b may be useful for providing bright light that may be distributed to several portions 74b of the translucent layer 74 via a light guide layer 78. The second light source 65a and 65b may be mounted onto the substrate 82. The second light source may be an EL panel. However, since EL panels typically emit less intense light than LED devices, it may be more difficult to distribute adequate light to several portions 74b of the translucent layer 74 via a light guide layer 78.

The second light sources 65a and 65b project light through the light guide layer 78. Part of the projected light 93 will transmit through a portion 74b of the translucent layer 74 and become visible outside the handset device 50. Part of the projected light 92 will be prevented by the opaque layer 76 from entering the translucent layer 74. Part of the projected light 91 will be prevented by the first light source 60 from entering a portion 74a of the translucent layer 74.

Note that the second lighting sources 65a and 65b may be placed very near, even under, the first light source 60. Therefore, it is possible to independently backlight very closely spaced images on the handset device 50. For example, images such as the "2" and "play arrow" appear above a common keypad 34 in the handset device 20 of FIG. 1. Referring again, to FIG. 2, for example, the first light source 60 may be placed directly under a first portion 74a of the translucent layer 74 where the opaque layer 76 defines a music mode "play arrow". A second light source 65b may be placed below the first light source 60 and under a second, very nearby portion 74b or the translucent layer 74. The opaque layer 76 defines a phone mode "2". The body of the first light source 60 prevents light projected by the underlying second light source 65b from entering the first portion 74a of the translucent layer 74. In phone mode, the first light source 60 is enabled to project light 94 through the first portion 74a of the translucent layer 74 and to thereby generate the "play arrow." Meanwhile, the second light sources 65a and 65b are disabled so that the "2" image is invisible. In music mode, the first light source 60 is disabled and the second light source 65a and 65b is enabled to project light through the second portion 74b of the translucent layer 74 and to thereby generate the "2" image. Meanwhile, the body of the first light source 60 prevents light 91 from the second light source 65a and 65b from entering the first portion 74a of the translucent layer 74.

Figure 5:
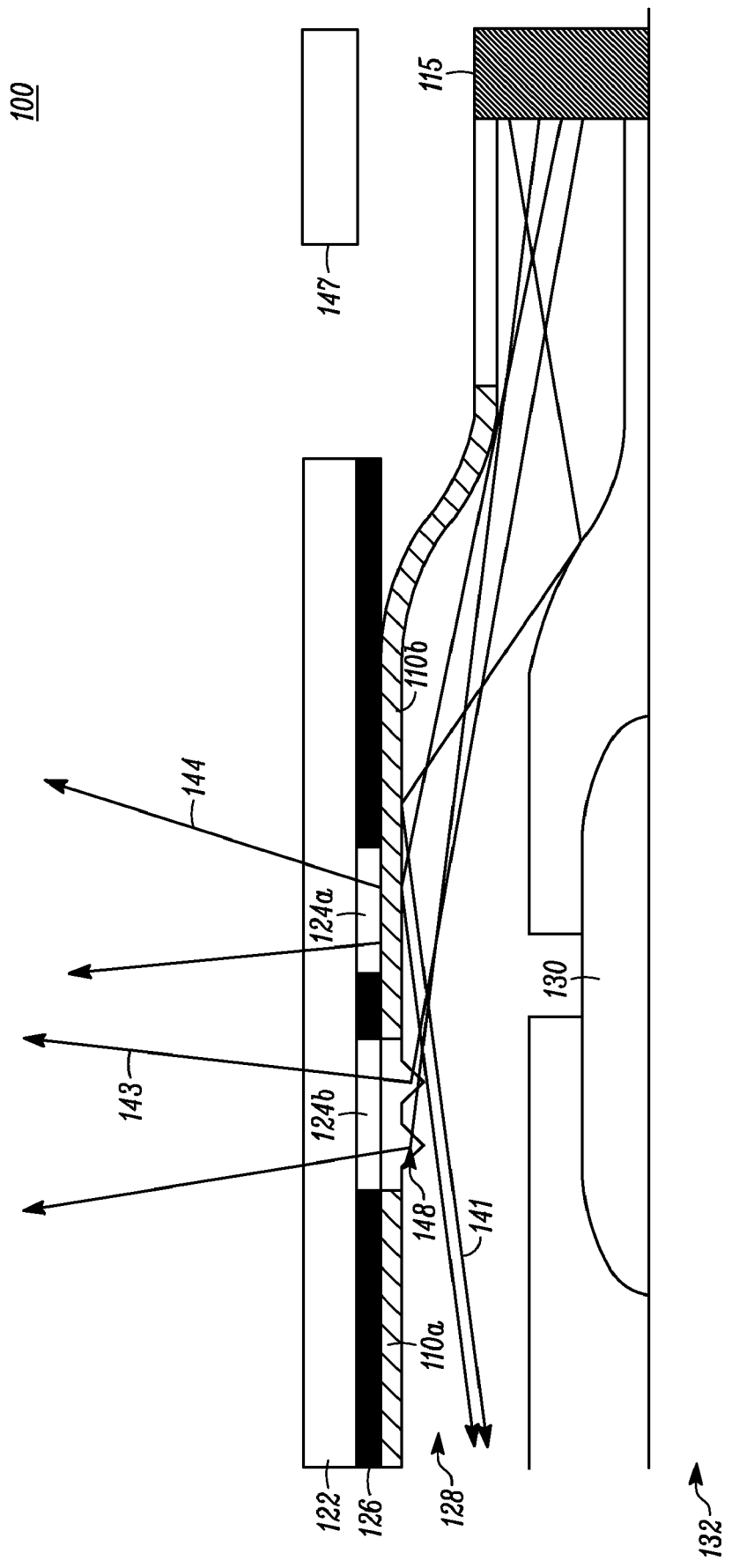
FIG. 5 illustrates one example of a modal lighting controlled device in accordance with one embodiment of the invention.

FIG. 5 is a cross sectional view illustrating one example of a modal lighting controlled device in accordance with one embodiment of the invention. In this example, the second light source 115 is offset from the area of the keypad 130. Again, the device 100 includes at least one keypad 130 that may be mounted on a substrate 132. In this example, a first light source 110*a* and 110*b* is included that is operative to project light 144 through a first portion 124*a* of translucent layer. A second light source 115 is included that is operative to project light 143 through a second portion 124*b* of translucent layer. However, the second light source 115 may be placed some distance away from the keypad 130. A light guide layer 128 is used to transmit light 141 and 143 projected by the second light source 115. The first light source may be made up of EL panels 110*a* and 110*b* arranged to prevent light projected from the second light source 115 from entering the first portion 124*a* of the translucent layer. Some of the light 141 from the second light source 115 will therefore be deflected or absorbed by the EL panel 110*b* such that this light 141 is prevented from entering the first portion 124*a* of the translucent layer. Some of light 143 from the second light source 115 will be directed by the light guide layer 128 to a second portion 124*b* of the translucent layer. The light guide layer 128 may have a surface interface 148 under the second portion 124*b* of translucent layer that is shaped to direct this light 143 upwards. The light guide layer 128 may be further operative to aid in mechanical depress of the keypad 130. The EL panels 110*a* and 110*b* may be laminated onto the overlying opaque layer 126, or onto the wave guide layer 128. A PC film layer 122 may be included as a covering surface for the handset device 100.

Remote placement of the second light source 115 may be helpful for mitigating interactions between the lighting sources and the handset antenna 147. For example, EL panels typically are constructed with metal and operate with relatively large AC voltages. As a result, EL panels may interfere with operation of a handset antenna. Therefore, EL panels 110*a* and 110*b* may need to be spaced a substantial distance from the antenna 147 to prevent interference. By contrast, LED devices 115 typically operate at low DC voltages and do not interfere with operation of the antenna 147. Therefore, an LED second light source 115 may be placed much closer to the antenna 147.

Figure 6:
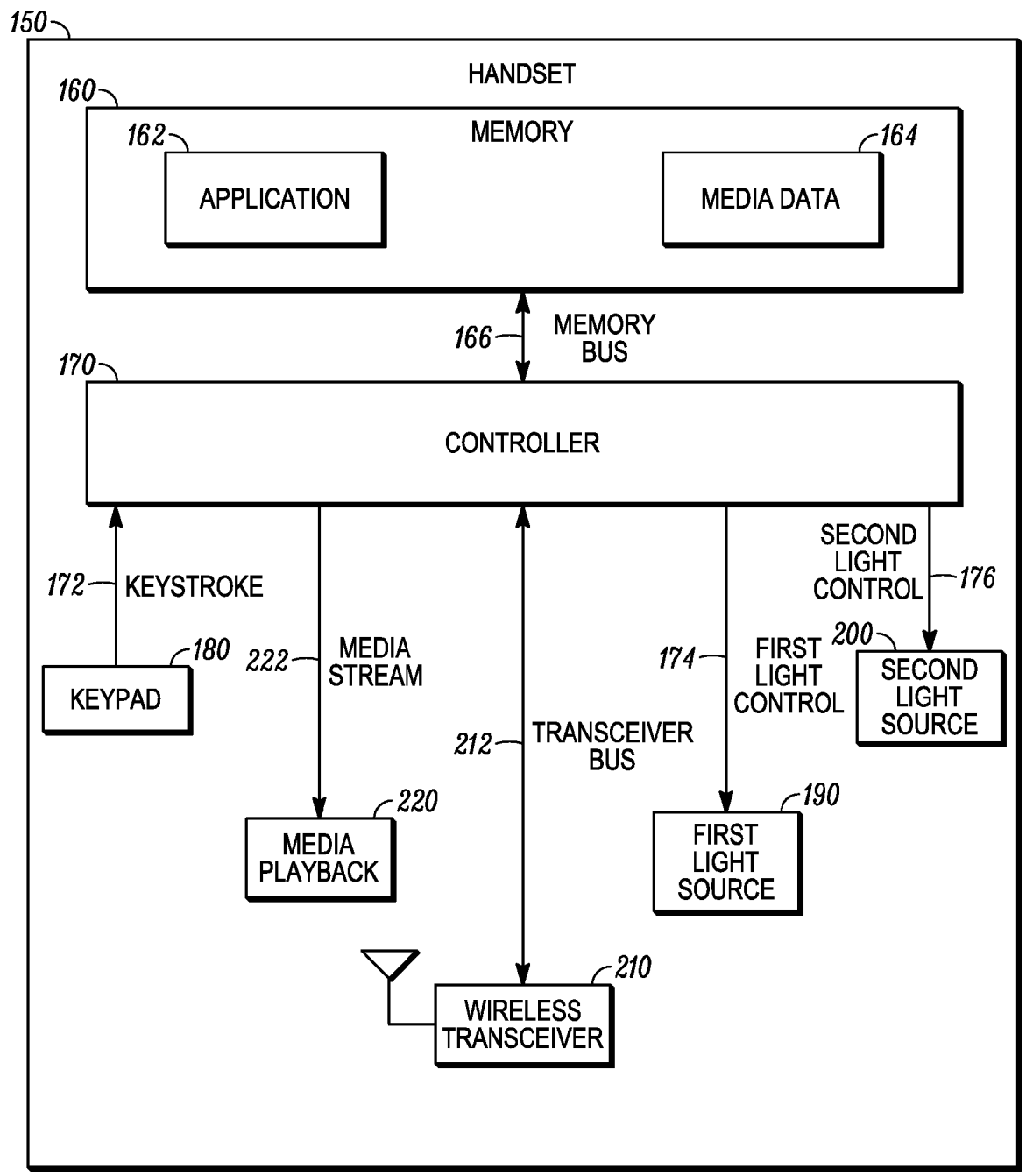
FIG. 6 is a schematic block diagram illustrating one example of a handset device with modal lighting control in accordance with one embodiment of the invention.

FIG. 6 is a schematic block diagram illustrating one example of a handset device with modal lighting control in accordance with one embodiment of the invention. The handset device 150 may be embodied as any suitable mobile communication device including, but not limited to, a cellular telephone, an internet appliance, a laptop computer, a palmtop computer, a personal digital assistant, a digital entertainment device, a radio communication device, a tracking device, a personal training device, or a combination thereof. In particular, the handset device 150 is preferably a device that connects to a wireless communications service, such as a cellular telephone service. For purposes of illustration only, a cellular telephone handset device 150 with media playback capability is exemplified, and includes: a controller 170; memory 160 including stored data representing an application 162 and media data 164; a keypad 180; a first light source 190; a second light source 200; a wireless transceiver 210; and a media playback module 220. In this example, the controller 170 executes software instructions obtained from the memory 160 via a memory bus 166 to control the operation of the handset device 150. The controller 170 is operatively coupled to the memory 160, the keypad 180, the first light source 190, the second light source 200, the wireless transceiver 210, and the media playback module 220.

In this example, the controller 170 may be, for example, a DSP, microcontroller, central processing unit, baseband processor, co-processor, or any suitable processing device. In addition it may be discrete logic, or any suitable combination of hardware, software or firmware or any suitable structure. The operational instructions, or software, executing on the controller 170 may be stored in memory 160 which may include a single memory device or a plurality of memory devices. Such a memory 160 may include any memory element that stores digital data including, but not limited to, RAM, ROM, flash memory, hard disk drive, distributed memory such as servers on a network, or CD-ROM or any suitable storage medium. It will be recognized that such memory may be integrated with the controller or take any suitable configuration.

The controller 170 may be operative to receive keystrokes 172 from the keypad 180 when, for example, a user mechanically depresses the keypad 180 as is known in the art. The controller 170 may control the projection of light from the first and second light sources 190 and 200. For example, a first light control 174 may be used by the controller 170 to turn the first light source 190 ON or OFF. Similarly, a second light control 176 may be used by the controller 170 to turn the second light source 200 ON or OFF. The controller may independently control the first and second light sources 190 and 200 such that either light source may be ON or OFF at any time depending on the modal lighting control desired. A larger number of such light sources may be used in the handset device 150 to provide multiple lighting modes.

The controller 170 may have a wireless communication operating mode wherein the controller is operative to transmit or receive signals, voice, data, or other content over a wireless network via the wireless transceiver 210 by methods known in the art. The controller 170 may be coupled to the wireless transceiver 210 via a transceiver bus 212. The controller 170 may have a media playback operating mode wherein the controller is operative to control playback of media data, such as music, video, or other content stored in the handset memory 160, via a media playback module 220 by methods known in the art. The controller 170 may transfer data via a media stream 222 to the media playback module 220.

Figure 7:
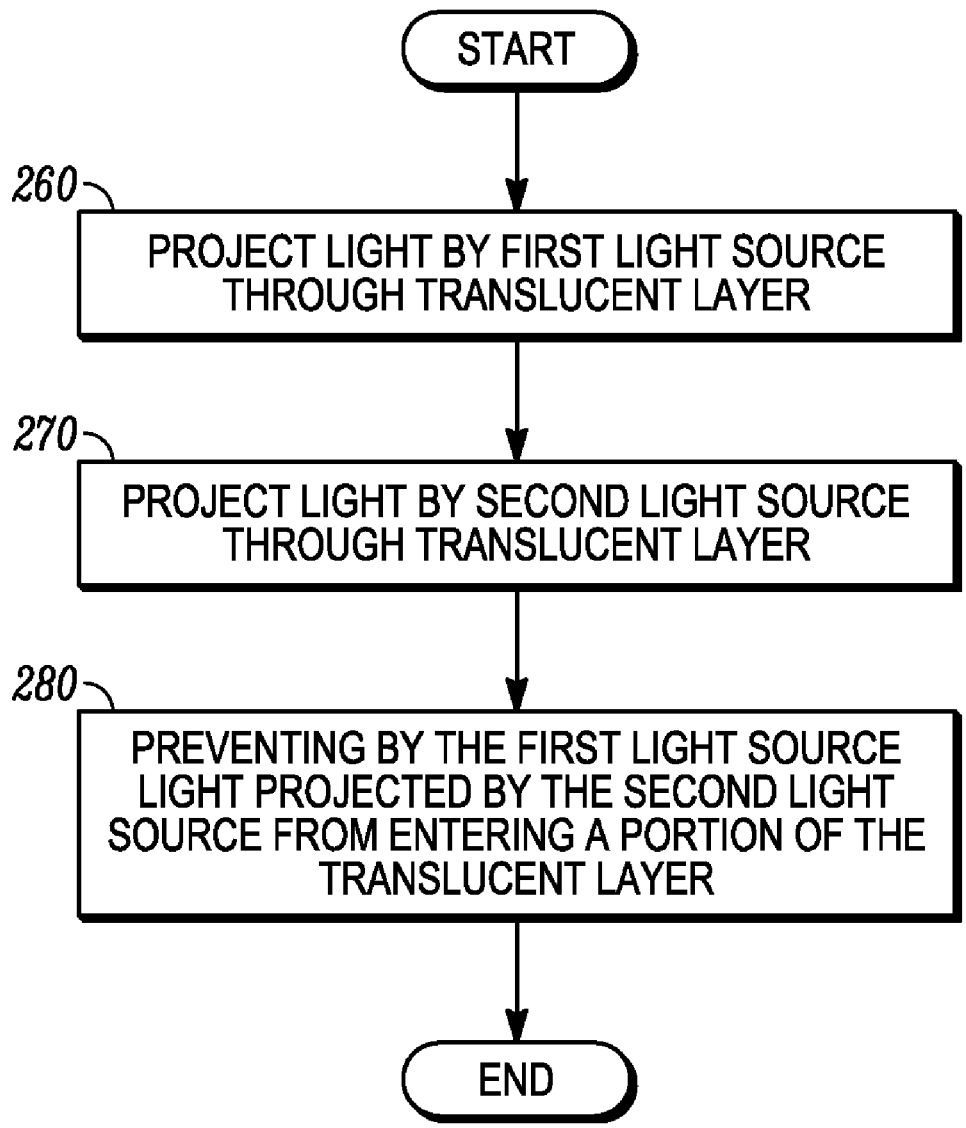
FIG. 7 is a flowchart illustrating one example of a modal lighting control method in accordance with one embodiment of the invention.

FIG. 7 is a flowchart illustrating one example of a modal lighting control method 250 in accordance with one embodiment of the invention. In step 260, light is projected by a first light source through a translucent layer. In step 270, light is projected by a second light source through the translucent layer. In step 280, the first light source light prevents light projected by the second light source from entering a portion of the translucent layer.

As such, among other advantages, the methods and apparatus disclosed can enable modal lighting of the keypad of the device. Various portions of a translucent layer over the device keys may be selectively lit based on the operating mode of the device. The number of keys required to implement multiple operating modes may be reduced through key sharing. A shared key may have different lighting and/or graphics depending on the operating mode. The space requirements for implementing modal lighting are optimized by using one lighting source to advantageously prevent light projected by another light source from entering a portion of the translucent layer. Other advantages will be recognized by those of ordinary skill in the art.

The above detailed description of the invention, and the examples described therein, has been presented for the purposes of illustration and description. While the principles of the invention have been described above in connection with a specific device, it is to be clearly understood that this description is made only by way of example and not as a limitation on the scope of the invention.

What is claimed is:

1. A device with modal lighting comprising:
   a translucent layer;
   a first light source operative to project light through the translucent layer; and
   a second light source operative to project light through the translucent layer wherein the first light source prevents light projected from the second light source from entering a portion of the translucent layer.

2. The device of claim 1 wherein the first light source is an electroluminescent panel.

3. The device of claim 1 wherein the second light source is a light emitting diode.

4. The device of claim 1 further comprising a light guide between the second light source and the translucent layer.

5. The device of claim 4 wherein the first light source is laminated onto the light guide.

6. The device of claim 4 wherein the first light source is molded onto the light guide.

7. The device of claim 1 further comprising an opaque layer operative to selectively prevent light projected by the first or second light sources from entering the translucent layer.

8. The device of claim 1 wherein projection of light by the first and second light sources is based on an operating mode of the device.

9. The device of claim 1 further comprising a keypad underlying the translucent layer.

10. A device with modal lighting comprising:
    a keypad;
    a translucent layer overlying the keypad;
    a first light source operative to project light through the translucent layer;
    a second light source operative to project light through the translucent layer wherein the first light source prevents light projected by the second light source from entering a portion of the translucent layer; and
    a controller operatively coupled to the keypad, the first and second light sources and operative to receive a keystroke from the keypad and to control the projection of light from the first and second light sources.

11. The device of claim 10 wherein the first light source is an electroluminescent panel.

12. The device of claim 10 wherein the second light source is a light emitting diode.

13. The device of claim 10 further comprising a light guide between the second light source and the translucent layer.

14. The device of claim 10 further comprising an opaque layer operative to selectively prevent light projected by the first or second light sources from entering the translucent layer.

15. The device of claim 10 wherein the control of the projection of light by the first and second light sources is based on an operating mode of the device.

16. The device of claim 15 further comprising a media playback module operatively coupled to the controller wherein media playback is one of the operating modes of the device.

17. The device of claim 15 further comprising a wireless transceiver operatively coupled to the controller wherein wireless communication is one of the operating modes of the device.

18. A method for modal lighting in a device comprising:
    projecting light by a first light source through a translucent layer;
    projecting light by a second light source through the translucent layer; and
    preventing, by the first light source, light projected by the second light source from entering a portion of the translucent layer.

19. The method of claim 18 wherein the first light source is an electroluminescent panel.

20. The method of claim 18 wherein the second light source is a light emitting diode.

21. The method of claim 18 further comprising projecting light by the second light source through a light guide prior to projecting light by the second light source through the translucent layer.

22. The method of claim 18 further comprising preventing, by an opaque layer, light projected by the first or second light sources from entering a section of the translucent layer.

23. The device of claim 18 wherein the projecting of light by the first light source does not depend on the projecting of light by the second light source.

* * * * *